United States Patent [19]

Nakao et al.

[11] Patent Number: 4,538,830
[45] Date of Patent: Sep. 3, 1985

[54] BABY CARRIAGE

[75] Inventors: Shinroku Nakao, Kanagawa; Hideo Saito, Tokyo; Hitoshi Kato, Tokyo; Yoshiyasu Ishii, Tokyo; Hiroaki Matsuda, Tokyo, all of Japan

[73] Assignee: Combi Co., Ltd., Tokyo, Japan

[21] Appl. No.: 459,030

[22] Filed: Jan. 18, 1983

[30] Foreign Application Priority Data

Jan. 19, 1982 [JP] Japan .................................. 57-6435

[51] Int. Cl.³ .............................................. B62B 11/00
[52] U.S. Cl. .................................................. 280/647
[58] Field of Search ............... 280/647, 648, 649, 650, 280/642, 643, 644, 658, 47.4; 297/DIG. 4

[56] References Cited

U.S. PATENT DOCUMENTS 2,401,342  6/1946  Eckhardt ............................ 280/643
2,872,203  2/1959  Hedstrom .......................... 280/643
4,089,543  5/1978  Osborne ............................ 280/647

Primary Examiner—Richard A. Bertsch
Attorney, Agent, or Firm—Sughrue, Mion, Zinn, Macpeak, and Seas

[57] ABSTRACT

A baby carriage comprises a backrest frame, a sheet of canvas spreaded out on the frame, the sheet having a backrest portion and a head frame located above the backrest portion, the head frame being bandable into an L-shaped form as viewed from either side, and a device mounted on the back of the backrest portion and the head frame for setting the head frame, the device comprising a base frame, an anchoring rod slidably mounted in the base frame and a receiving frame capable of engaging with the rod, whereby the devices permits angular movement of the backrest portion.

13 Claims, 18 Drawing Figures

BABY CARRIAGE

BACKGROUND OF THE INVENTION

The present invention relates to a foldable baby carriage.

There has been provided a foldable baby carriage having a pair of similar side frames of interpivoted bars and cross-members integral with the side frames, the cross-members having only intermediate hinges which come into coaxial alignment when the side frames are folded, such that the side frames can then close together like a book. Such a baby carriage is disclosed in U.S. Pat. No. 3,989,295 issued on Nov. 2, 1976. However, in such a baby carriage, it is impossible to make the backrest portion fully inclined to the full-flat condition, and it is also impossible to protect the baby lying on the chair from falling-down.

SUMMARY OF THE INVENTION

It is, therefore, an object of the present invention to provide a foldable baby carriage which has a simple folding mechanism and a backrest portion capable of being inclined to a plurality of angles by a reclining operation.

It is another object of the invention to provide a foldable baby carriage which can prevent an infant seated in the carriage from falling even when the backrest portion is fully inclined into a bedlike position.

It is a further object of the present invention to provide a foldable baby carriage which is equipped with a guard for preventing an infant seated in the carriage from falling forward when the infant lies in a horizontal position, and which permits an unrestricted folding operation without the necessity of detaching the guard.

According to the invention, there is provided a baby carriage comprising a backrest frame, a sheet of canvas laid around said backrest frame, said sheet having a backrest portion and a head frame located above said backrest portion, said head frame being bendable into an L-shaped form in cross section, and means for setting said head frame to said backrest portion, said setting means including a base frame, an anchoring rod slidably mounted in said base frame and a receiving frame capable of engaging said anchoring rod, said setting means being mounted on a rear side of said backrest portion and said head frame whereby said setting means permits angular movement of said backrest portion.

BRIEF DESCRIPTION OF THE DRAWINGS

The accompanying drawings show one example of the present invention, in which.

DETAILED DESCRIPTION OF THE PREFERRED EMBODIMENTS

Referring to FIGS. 1-5, there is shown a baby carriage embodying the invention. The framework of the carriage comprises a handle rod 1, a pair of seat bottom frames 2, a pair of armrests 3, a pair of front leg rods 4 and a pair of rear leg rods 5. Two links 6 and 7 and a step 8 extend across the framework to complete the general construction of the carriage. The upper ends of the rods 4 and 5 are each pivoted to a position close to the front end of each armrest 3. The handle rod 1 is shaped like an inverted "U", and the lower end portions of the rod 1 are pivoted to the intermediate portions of the rear leg rods 5 via angle brackets 9. The rod 1 is also pivotally coupled to the respective rear ends of the respective armrests 3.

Figure 8:
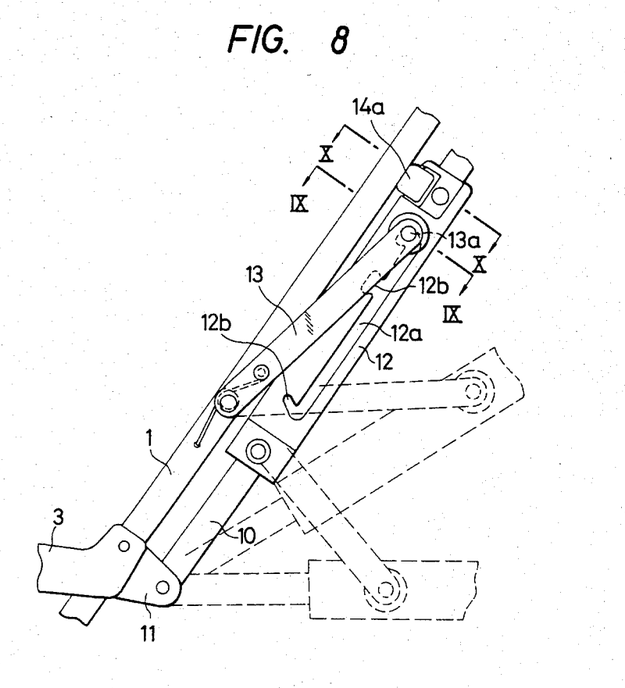
FIG. 8 is a side elevational view of an inclination angle adjuster.
Figure 9:
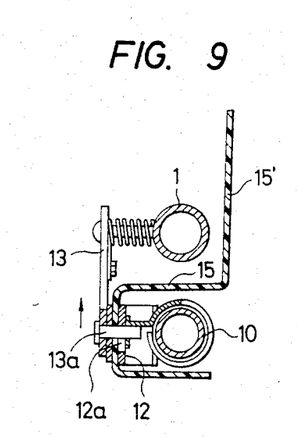
FIG. 9 is a cross-sectional view taken along line IX—IX of FIG. 8.

A backrest frame 10 is angularly movably mounted at the rear of the handle rod 1 on brackets 11 through which the lower end portions of the rod 1 resembling an inverted "U" are mounted to the framework. Installed to the frame 10 are a pair of inclination angle adjusting plates 12 (see FIG. 8), each of which is provided with a guide slot 12a in the longitudinal direction. Each anchoring pin 13a is secured to one end of an arm rod 13, the other end of which is pivoted to the rod 1. The anchoring pins 13a are slidably received and anchored in their respective guide slots 12a. Formed above the slots 12a at a given distance are anchoring slots 12b, and when the pins 13a are received in the respective slots 12b, it is possible to adjust the angle at which the backrest frame 10 is inclined.

Figure 10:
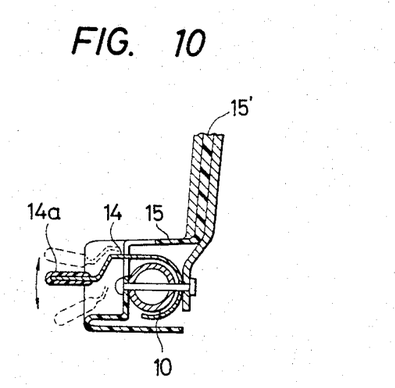
FIG. 10 is a cross-sectional view taken along line X—X of FIG. 8.
Figure 11:
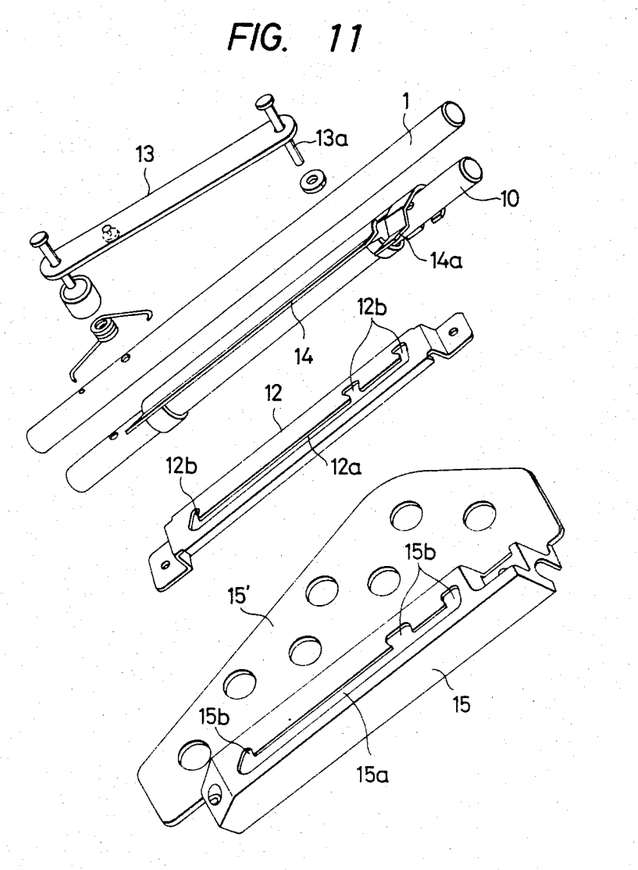
FIG. 11 is an exploded perspective view of the adjuster of FIG. 8.

As shown in FIGS. 10 and 11, an operation plate 14 for disengaging the associated pin 13a from the associated slot 12b is mounted to the backrest frame 10 so that its long planar portion is located on the underside of the associated adjusting plate 12. Protruding outwardly from the adjusting plate 12 is only an operation claw 14a formed on one end of the operation plate 14. A cover 15 for the plate 12 is made of synthetic resin or the like and has one side portion integral with a side protector 15' having an angled side. As can be seen from FIG. 11, the cover 15 is provided with slots 15a and 15b which correspond to the guide slot 12a and anchoring slots 12b, respectively. Generally, both ends of the adjusting plate 12 are fixedly secured to the backrest frame 10. However, when the cover 15 is used, it is also possible to attach the cover to the frame 10 and to fix the adjusting plate 12 to the cover.

Figure 1:
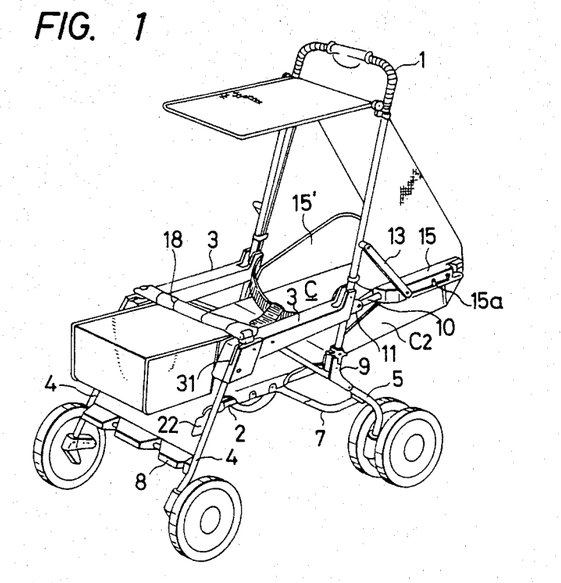
FIG. 1 is a perspective view of a baby carriage according to the invention showing the condition in which the backrest frame is folded.
Figure 2:
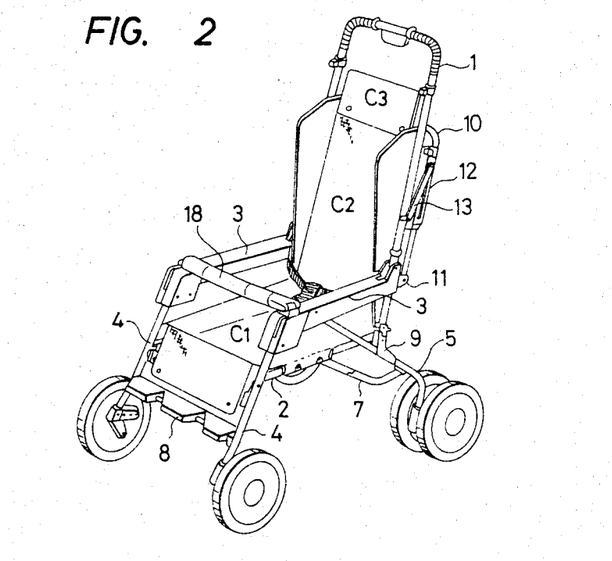
FIG. 2 is a view similar to FIG. 1, but showing the condition in which the accessories shown in FIG. 1 are removed and the backrest frame is raised.
Figure 3:
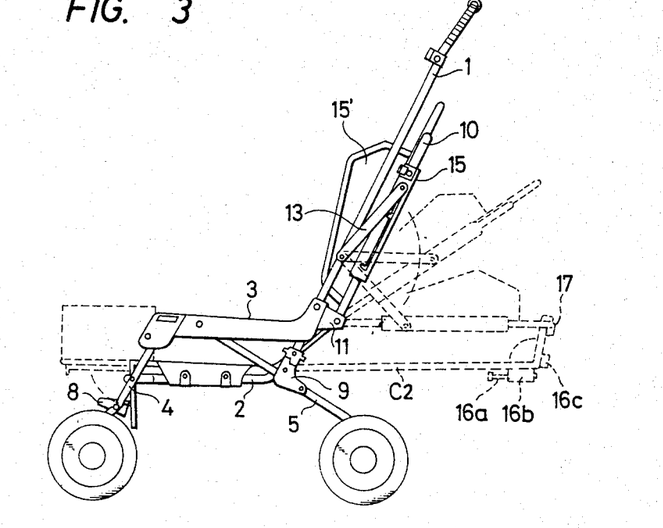
FIG. 3 is a side elevational view of the carriage of FIG. 1 showing the manner in which the inclination angle of the backrest frame is adjusted and the head frame is set.
Figure 4:
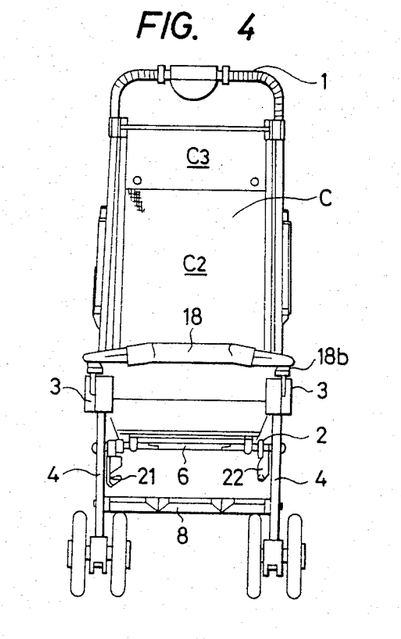
FIG. 4 is a front elevational view of the carriage of FIG. 1.
Figure 5:
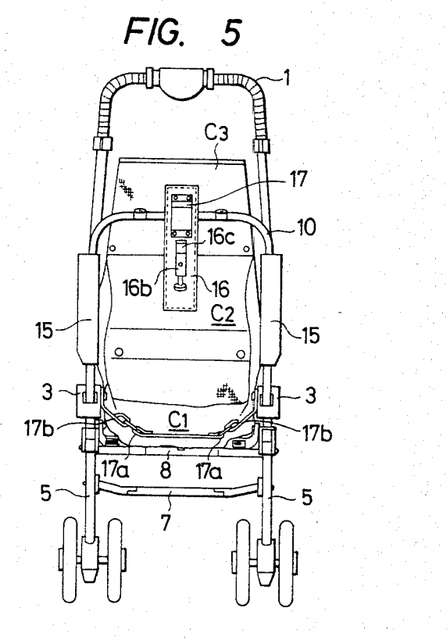
FIG. 5 is a rear elevational view of the carriage of FIG. 1.
Figure 6:
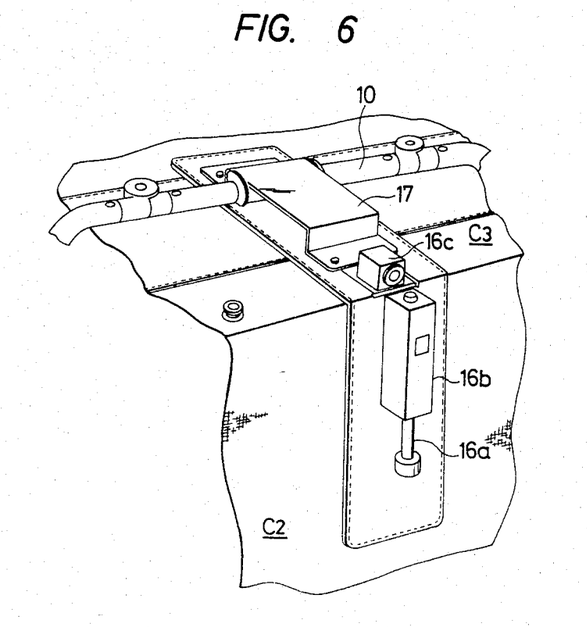
FIG. 6 is an enlarged perspective view of the head frame under the set condition.
Figure 7:
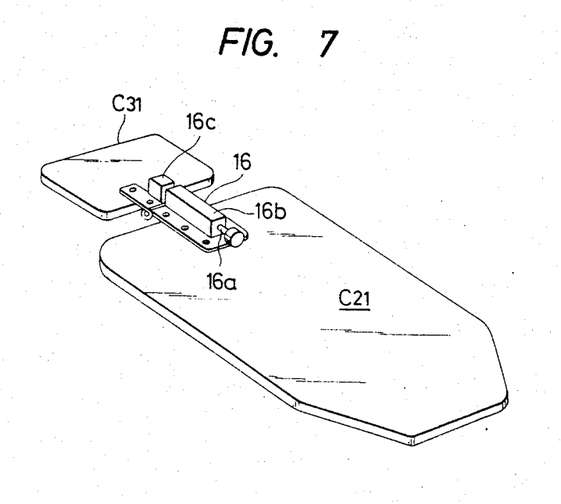
FIG. 7 is a perspective view of the reinforcing center plates and a device for setting the head frame, showing the arrangement of these means.

An infant is seated on one long sheet of canvas C, which includes a seat C1 on the lower side and a backrest C2 at the upper side. The portions of the seat C1 which are located near its front end are fixed to the bottom frames 2, while the portions of the seat which are near the upper end of the backrest C2 are fixed to the opposite sides of the backrest frame 10 near the top of the frame 10. The backrest C2 can be bent into an L-shaped form as viewed from either side near its upper end, and the upper portion of the L-shaped member serves as a head frame C3. Reinforcing center plates C21 and C31 (FIG. 7) are inserted into the backrest C2 and the head frame C3, respectively.

Figures 12, 13, 15:
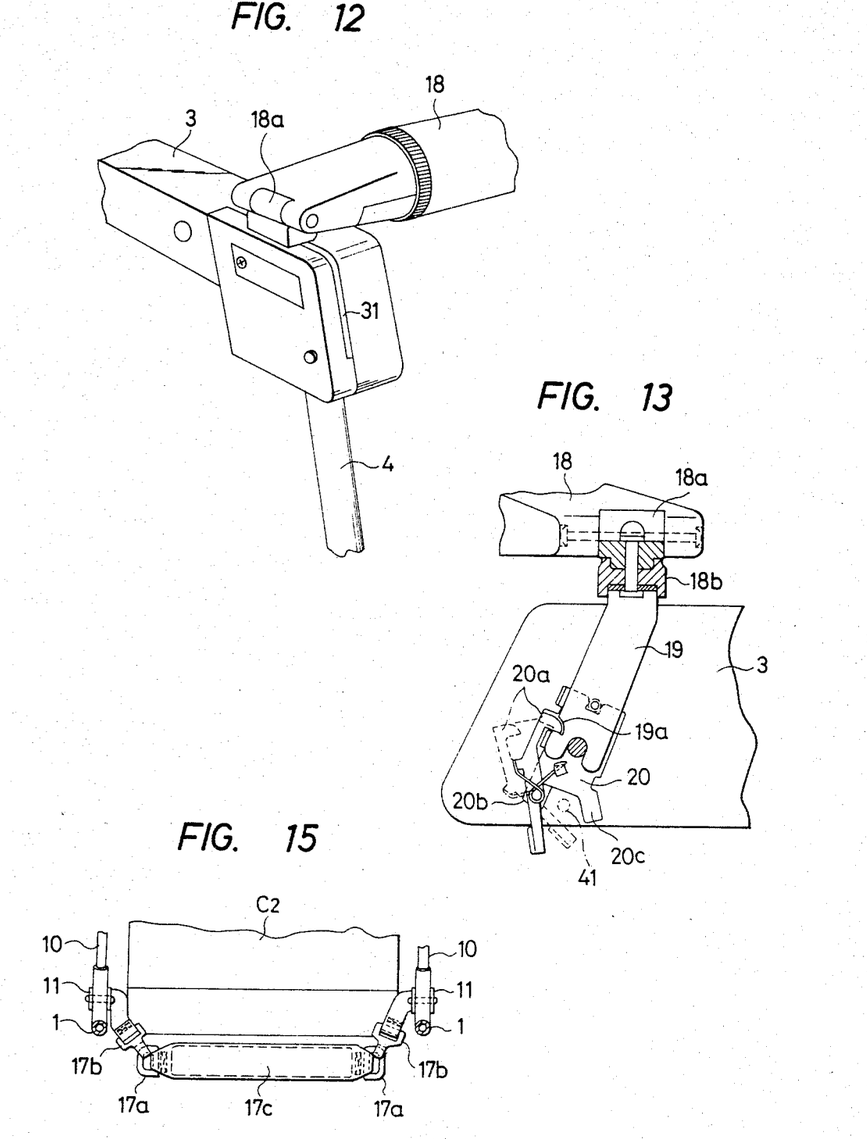
FIG. 12 is an enlarged perspective view of means for causing the armrest to engage the guard frame.
FIG. 13 is a longitudinal sectional view of the means of FIG. 12.
FIG. 15 is a rear elevational view of the means for preventing the sheet of canvas from sinking.

A device 16 for setting the head frame is composed of an anchoring rod 16a, a base frame 16b in which the rod 16a is slidably installed, and a receiving frame 16c with which the tip of the rod 16a can be brought into engagement. The base frame 16b and the receiving frame 16c are securely fixed to the upper fringe of the backrest C2 and the lower fringe of the head frame C3, respectively. A holder 17 for the backrest frame 10 is shaped so as to be convex and firmly fixed to the backside of the head frame C3 such that the top of the backrest frame 10 is inserted in the space under the convex holder. It is to be understood that the aforementioned reinforcing center plates C21 and C31 are especially effective for securing the device 16 and the holder 17. A pair of rings 17a disposed at the intermediate positions along the length of the sheet C, that is, at the boundary between the seat C1 and the backrest C2, on the opposite sides on the back of the sheet engage with anchoring hooks 17b depending from the armrest 3 near its rear end and act to prevent the sheet of canvas from sinking in, as shown in FIG. 15. It is desirable that the backside of the sheet on which the rings 17a are installed be reinforced by a band of cloth 17c, which is sewn into the sheet or abutted against it in such a manner that the band covers the underside of the rings.

Figure 14:
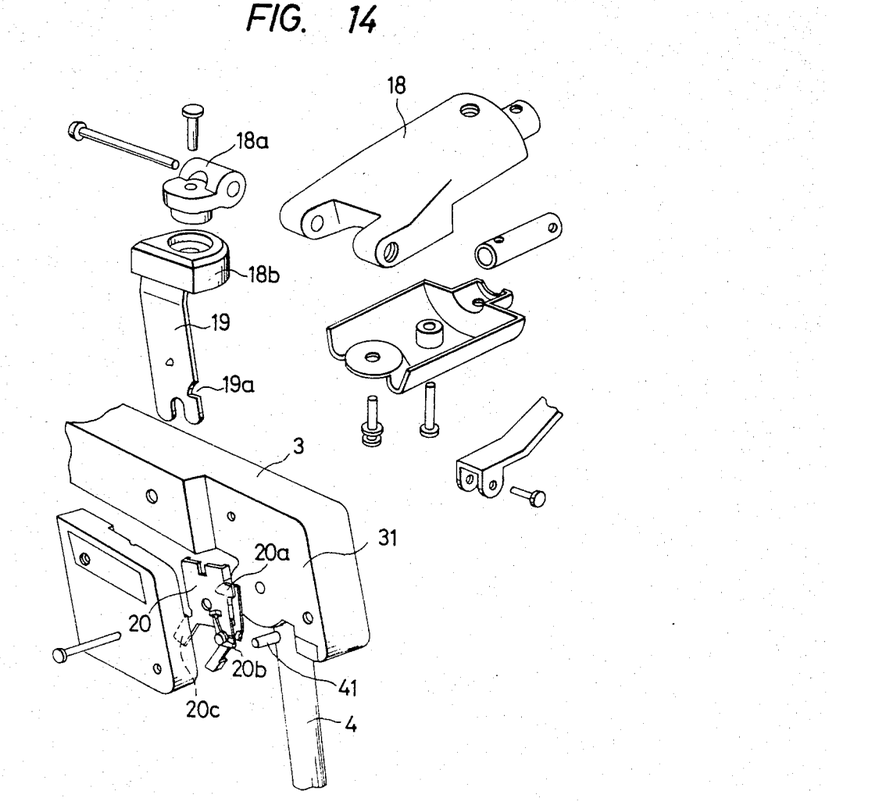
FIG. 14 is an exploded perspective view of the means of FIG. 12.
Figure 16:
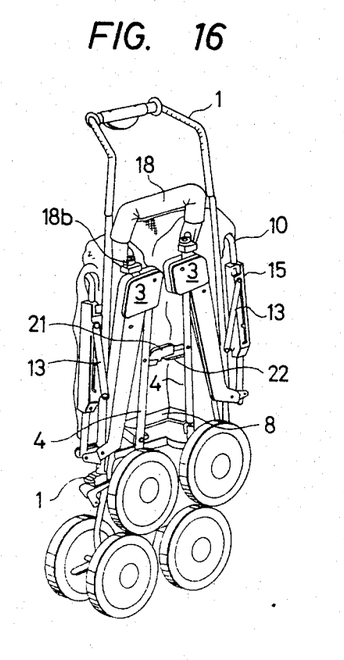
FIG. 16 is a perspective view of the whole baby carriage in the folded condition.
Figure 17:
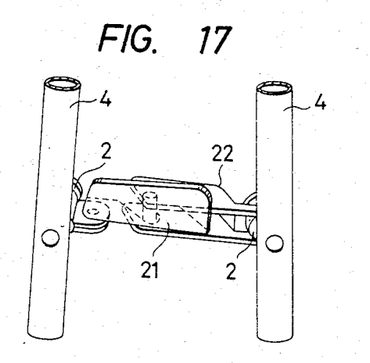
FIG. 17 is a fragmentary front elevational view of the carriage showing a hook for maintaining the folded condition.
Figure 18:
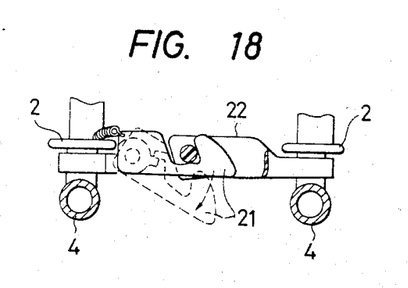
FIG. 18 is a plan view of the means shown in FIG. 17.

Referring next to FIG. 14, a guard frame 18 is installed on the top of the armrest 3 in a detachable and foldable way. The frame 18 is pivoted to the armrest at two positions which substantially trisect the length of the frame 18 in the direction of the axis about which the frame 18 can rock, so that the frame can be folded into a flat U-shaped form. Secured on either side of the U-shaped portion are a pair of insertion members 19, each of which is fixed to the frame 18 via a guide joint 18a and a receiving base 18b. The base 18b is rotatably secured to the tip of the joint 18a, which can swing only in the direction of the length of the guard frame. The members 19 are slidable within respective slots 31 each of which extends from a position close to the edge of the top rod of the associated armrest 3 to a point on the end surface. The members 19 mounted on either end of the frame 18 are caused to detachably engage with their respective brackets 20, each of which is pivotally secured to the inside of the end of the associated armrest 3. The brackets 20 can swing according to the angular movement of the front leg rods 4. Each insertion member 19 is provided with a notch 19a near its lower end for removably engaging a respective claw 20a pivoted to the brackets 20. Claws 20b and 20c for angular movement protrude from the lower end of each bracket 20 and engage with operation pins 41 protruding from the vicinities of the upper ends of the front leg rods 4. When the rods 4 tilt toward the rear leg rods 5 in the folding operation, the pins 41 push the respective claws 20c to tilt the respective entire brackets 20 toward the end surfaces of the armrests 3. At the same time, each insertion member 19 is inclined forwardly and, accordingly, each guard frame 18 moves toward the end surface of the corresponding armrest 3. On the other hand, when the front leg rods 4 are raised while the carriage is in use, the pins 41 push the claws 20b of the brackets and the brackets 20 operate in the reverse manner. As a result, the guard frame 18 will be located above the armrests 3. Indicated by numerals 21 and 22 are hooks for maintaining the folded condition of the carriage. These hooks are installed on one end of their respective seat bottom frames 2 and are so constructed that one serves as an anchored hook element 21 and the other as an anchoring ring element 22. Accordingly, when the framework of the carriage is folded and both elements come into contact with each other, they automatically engage each other. Therefore, only when both elements are to be disengaged from each other, an operator is required to operate the elements. It is to be noted that the handle rod 1, backrest frame 10, two links 6, 7 and step 8 are all foldable into flat U-shaped form in the same manner as the guard frame 18.

The baby carriage constructed as described above has advantages as follows:

(I) Backrest Mechanism (i) Since the backrest frame 10 formed at the rear of the handle rod 1 can be inclined to any desired angle by means of the arm rods 13 and the inclination angle adjusting plates 12, any appropriate inclination angle can be immediately selected according to the age of the infant seated in the carriage.

(ii) Because engaging rings 17a for preventing the sheet of canvas C from sinking are mounted on the back side of the sheet at the boundary between the seat base C1 and the backrest C2 and engage with the anchoring hooks 17b depending from the vicinities of the rear ends of the armrests 3, the supporting portions, which are under the loins of the infant seated on the carriage and accordingly are weighted most heavily, are prevented from sinking when the sheet of canvas C is fully inclined to the horizontal condition, whereby the appropriate sleeping posture of the infant can be maintained.

(iii) Conventional baby carriages allow rearwardly inclined conditions in addition to the normal seat condition. Therefore, such carriages have used a guard frame and side protectors to prevent the infant from falling off in the forward and side directions, respectively, and in actuality, this object has been satisfactorily achieved. In the carriage according to the prevent invention, the sheet of canvas C can be inclined to a horizontal condition and so an infant lying in a horizontal position might fall off headfirst in the absence of preventive means. Thus, the head frame C3 is formed on top of the backrest C2 of the sheet of canvas C in an integral fashion, and these means can be easily operated and set by the device 16 for setting the head frame. Consequently, the infant lying on the fully flat sheet is prevented by the head frame C3 from moving with its head foremost. In this way, the safety of the infant is ensured.

(II) Guard Frame Mechanism (i) Because the guard frame 18 is detachably installed on the front ends of the armrests 3 via insertion members 19, and because brackets 20 holding the members 19 are swingably secured in the armrests 3, when the framework of the carriage is folded, the guide frame 18 is moved from the upper surfaces of the front ends of the armrests 3 to one side, and is then folded into a U-shaped form. Accordingly, the necessity of removing the guard frame 18 whenever the carriage is folded, is removed.

(ii) Because the insertion members 19 are installed on the ends of the guard frame 18 via the guide joints 18a which can swing only outwardly along the length of the frame 18, the angle formed between the frame 18 and the members 19 is variable. Therefore, when the carriage is folded, the guard frame 18 can be smoothly bent.

(III) Mechanism for Maintaining the Folded Condition

Because each end of the seat bottom frames 2 are equipped with the anchored hook element 21 and the ring element 22 anchoring the hook element, and because these elements are constructed so as to automatically engage with each other, the hook and ring elements come into mating engagement with each other by themselves in the course of a folding operation of the carriage. Further, the folded condition can be stably maintained.

What is claimed is:

1. A baby carriage, comprising; a backrest frame (10), a sheet of fabric (C) laid around said backrest frame, said sheet having a backrest portion (C2) and a head frame (C3) located above said backrest portion, said head frame being bendable with respect to said backrest portion into an L-shaped form in cross section, and means (16) for setting said head frame (C3) in an upright position with respect to said backrest portion (C2) at least when said backrest portion is reclined, said setting means (16) being mounted on a rear side of said backrest portion (C2) and said head frame (C3) whereby said setting means permits free angular movement of said backrest portion.

2. The baby carriage according to claim 1 further comprising a pair of seat bottom frames (2) having a seat (C1); and a handle rod (1) provided at a predetermined angle for carrying the baby carriage.

3. The baby carriage according to claim 2, further comprising means for inwardly collapsing and locking said seat bottom frames including hook means (21, 21), one of said hook means being installed on one end of each of said seat bottom frames (2).

4. The baby carriage according to claim 3, wherein each said hook means comprises an anchored hook element and an anchored ring element.

5. The baby carriage according to claim 2 further comprising means for adjusting and maintaining an angle defined by said handle rod (1) and said backrest frame (10).

6. The baby carriage according to claim 5, wherein said means for adjusting and maintaining includes a pair of arm rods (13), each of said arm rods being connected pivotally at one end to said handle rod (1) and at the other end to said backrest frame (10) through an adjusting plate (12).

7. The baby carriage according to claim 6, wherein said adjusting plate (12) of each of said arm rods (13) is covered by a cover (15), said cover having one side portion integrally formed with a side protector (15') and adjustment slots (15a, 15b).

8. The baby carriage according to claim 1, wherein said setting means comprises a base frame (16b), anchoring means (16a) slidably mounted in said base frame and a receiving frame (16c) capable of engaging with said anchoring means (16a).

9. The baby carriage according to claim 1, wherein said backrest frame (10) is pivotally provided so that said backrest portion (C2) may be rearwardly reclined to substantially the same level as that of said seat (C1) when said head frame is bent into said upright position.

10. The baby carriage according to claim 1, further comprising a holder (17) for said backrest frame (10), said holder being firmly fixed to the backside of said head frame (C3), and a top of said backrest frame (10) being inserted in a space under said holder.

11. The baby carriage according to claim 1, further comprising means for supporting said sheet of fabric (C) including a belt member (17c), a pair of rings (17a) disposed at each end of said belt member and a pair of anchoring hooks secured to said backrest frame (10).

12. A baby carriage, comprising; a pair of arm rests (3), a guard frame (18), and means (19, 20) for connecting an arm rest (3) and said guard frame (18) to each other, said connecting means being received within a slot (31) formed in said arm rest, each end of said guard frame being installed on a connecting means in a detachable and pivotable fashion so that said frame can be folded into a flat U-shaped form.

13. The baby carriage according to claim 12, wherein each said connecting means comprises an insertion member (19) fixed to said guard frame (18) via a double pivot joint (18a) and a receiving base (18b).

* * * * *